(12) United States Patent
Meijer et al.

(10) Patent No.: US 7,219,329 B2
(45) Date of Patent: May 15, 2007

(54) SYSTEMS AND METHODS PROVIDING LIGHTWEIGHT RUNTIME CODE GENERATION

(75) Inventors: Erik Meijer, Mercer Island, WA (US); Dario Russi, Redmond, WA (US); Peter F. Drayton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 10/461,105

(22) Filed: Jun. 13, 2003

(65) Prior Publication Data

US 2004/0255268 A1    Dec. 16, 2004

(51) Int. Cl.
    *G06F 9/44* (2006.01)
(52) U.S. Cl. .................... 717/106; 717/108
(58) Field of Classification Search ........ 717/106–108, 717/136, 139, 140, 146, 162–166, 107; 719/319, 719/331
    See application file for complete search history.

(56) References Cited

U.S. PATENT DOCUMENTS

| | | | |
|---|---|---|---|
| 5,761,477 A | | 6/1998 | Wahbe et al. |
| 6,151,618 A | | 11/2000 | Wahbe et al. |
| 6,189,137 B1 | | 2/2001 | Hoffman |
| 6,324,686 B1 | * | 11/2001 | Komatsu et al. ............ 717/148 |
| 6,327,702 B1 | | 12/2001 | Sauntry et al. |
| 6,339,841 B1 | * | 1/2002 | Merrick et al. ............ 717/166 |
| 6,463,582 B1 | * | 10/2002 | Lethin et al. ............... 717/158 |
| 6,546,546 B1 | | 4/2003 | Van Doorn |
| 6,651,248 B1 | * | 11/2003 | Alpern ....................... 717/162 |
| 6,865,730 B1 | * | 3/2005 | Burke et al. ................ 717/116 |
| 7,032,230 B2 | * | 4/2006 | Gray-Donald et al. ...... 719/331 |
| 7,058,929 B2 | * | 6/2006 | Charnell et al. ............ 717/135 |
| 7,076,773 B2 | * | 7/2006 | Schmidt ...................... 717/148 |
| 2004/0194111 A1 | * | 9/2004 | Marcey et al. .............. 719/310 |
| 2005/0240907 A1 | * | 10/2005 | Renouf ........................ 717/136 |

OTHER PUBLICATIONS

Jeremiah Willcock et al. "Using MPI with C# and the Common Language Infrastructure", Nov. 23-5, 2002, ACM 1-58113-599-8/02/0011.*
Glen McCluskey, "Using Java Reflection" Jan. 1998, retrived from online, http://java.sun.com/developer/technicalArticles/ALT/Reflection/index.html.*
java.sun.com "Implementing Delegates using Reflection", Apr. 12, 2003, retrived from online, http://java.sun.com/search/i.*
Emery D. Berger, et. al, "Composing High-Performance Memory Allocatiors", Jun. 1, 2001, ACM Press, vol. 36, Issue 5, pp. 114-123.*

(Continued)

*Primary Examiner*—Wei Zhen
*Assistant Examiner*—Anna Deng
(74) *Attorney, Agent, or Firm*—Amin, Turocy & Calvin, LLP

(57) ABSTRACT

The present invention relates to systems and methods that facilitate dynamic programming language execution in a managed code environment. A runtime code generator is provided within the framework of a managed object environment. The code generator includes a class allocator that reserves one or more method slots for a dynamic method call. A dynamic method builder then employs the method slots to generate an intermediate language stream that forms a method description. The method description is then fed to a Just-In-Tine (JIT) compiler that returns at least one dynamically generated pointer to facilitate execution of the dynamic method call at runtime.

21 Claims, 10 Drawing Sheets

OTHER PUBLICATIONS

Michal Cierniak, et. al, "Open Runtime Platform: Flexibility with Performancd using Interfaces", Nov. 2002, ACM Press, pp. 156-164.*

Peter Lee and Mark Leone. Optimizing ML with Run-time Code Generation. Proceedings of the ACM SIGPLAN 1996 Conference, pp. 137-148.

Andrew Kennedy and Don Syme. Design and Implementation of Generics for the .NET Language Runtime. Proceedings of the ACM SIGPLAN 2001 Conference, pp. 1-12.

Peter Sestoft. Runtime Code Generation in JVM and .NET CLR. Coplas/DIKU, Sep. 26, 2002. 22 pages.

Li Ding. Microsoft.NET and Sun Open Net Environment. University of Freiburg Institute of Computer Science, Jun. 2, 2002. 39 pages.

* cited by examiner

SYSTEMS AND METHODS PROVIDING LIGHTWEIGHT RUNTIME CODE GENERATION

TECHNICAL FIELD

The present invention relates generally to computer systems, and more particularly, to systems and methods that facilitate operations and execution of dynamic languages in a dynamic runtime environment.

BACKGROUND OF THE INVENTION

As computer science has evolved, object oriented programming has become one of many familiar models designers and programmers utilize to implement functionality within computer systems. The object model generally is defined by a class structure that includes class members providing both methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another.

A familiar system for communicating and interfacing between objects is known as the Component Object Model (COM), wherein another similar system is referred to as the Common Object Request Brokers Architecture (CORBA). Still yet other communication interfaces may be defined in languages such as JAVA within an operating framework of a Java Virtual Machine, for example. As these and other systems have been developed however, two common object architectures or models generally have emerged and may generally be defined in terms of managed and unmanaged object systems, for example.

Managed objects may be allocated from a heap within a managed software or execution environment and are generally not responsible for managing associated object lifetimes. Managed objects may be described in terms of a data type (e.g., metadata) and automatically collected (e.g., reclaimed) by a managed environment "garbage collector" that removes the object from memory when the object is no longer being accessed. In contrast, unmanaged objects may be allocated from a standard operating system heap, wherein the object itself is responsible for freeing memory it employs when references to the object no longer exist. This may be accomplished through well-known techniques such as reference counting, for example.

Various compilers and other tools expose a managed system's functionality that enable designers to write code that benefits from a managed execution environment. Thus, code that is developed with a language compiler that targets a managed system such as a Common Language Runtime or Java Virtual Machine is referred to as managed code. This type environment employs features such as cross-language integration, cross-language exception handling, enhanced security, versioning and deployment support, a simplified model for component interaction, and debugging and profiling services, for example.

To enable managed systems to provide services for managed code, language compilers typically emit metadata that describes the types, members, and references in managed code. Metadata is stored with the code, wherein a loadable common language runtime portable executable (PE) file contains the metadata. The managed system employs the metadata to locate and load classes, lay out instances in memory, resolve method invocations, generate native code, enforce security, and set run-time context boundaries.

The managed system automatically handles object layout and manages references to objects, releasing them when they are no longer being used. Objects whose lifetimes are managed in this manner are called managed data. As noted above, garbage collection mitigates memory leaks as well as some other common programming errors. If code is managed, designers can use managed data, unmanaged data, or both managed and unmanaged data in a respective application. Since language compilers supply their own types, such as primitive types, systems may not always know (or need to know) whether data is being managed.

A prototypical example whereby runtime code generation is beneficial relates to late bound calls as found in languages such as Visual Basic, ECMAScript, Python, Perl, PHP, Scheme, Ruby, and so forth. In these languages, the types of a receiver and arguments of a method call are not known statically, whereas the managed system method call instructions (e.g., call, callvirt, ldftn, ldvrtftn) require the static types of the method arguments and result. Hence, method dispatch is performed dynamically based on the runtime types of the receiver, actual arguments, and the static name of the method. This interpretative layer is one of the main reasons that late bound languages do not perform as well as statically typed languages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that provide a lightweight, low-cost, and type-safe mechanism for runtime code generation in a managed object environment. In one aspect of the present invention, a dynamic method component (e.g., method builder) is provided that enables dynamic languages employing late bound calls to dynamically generate pointers for respective method calls at or before runtime of dynamic language code. A class allocator is automatically invoked by a managed code module when dynamic method calls are made or executed in the managed code. The class allocator reserves one or more method table "slots" or memory locations that maintain a respective location for pointers that are to be dynamically mapped in response to the dynamic method calls. This is achieved by creating a method description from a dynamically generated intermediate language stream of tokens via the dynamic method component. The method description is then processed by a Just-In-Time (JIT) compiler in order to resolve the pointers for the dynamic method calls. After determining pointer values, the compiler returns the values to the pre-allocated slots that were created by the class allocator and in response to the dynamic method call. The calling module then reads the allocated slot locations to determine the function pointer for the respective method call. In this manner, late bound calls can be dynamically mapped at runtime to facilitate performance enhancements over conventional systems that employ static methods in accordance with interpretive processing layers. Other features of the present invention include automatic garbage collection of dynamic code to facilitate operations in a type-safe runtime environment.

In one aspect of the present invention, compiler functionality is exposed to a user or system as a set of Application Program Interfaces (APIs) that form a user model or managed "hook" into the compiler. The APIs are employed to generate and retrieve function pointers for dynamic method calls. These can include creating instance and static delegate types, creating function pointers, and extending static method builder classes to provide dynamic method building classes that process the dynamic method calls. In addition to providing runtime code generation in a managed code environment, dynamic systems and processes for generating pointers in response to dynamic method calls can be applied to various other applications. These applications include staged computation applications such as generating a state machine from a regular expression at runtime (e.g., generate state machine from VHDL expressions). Other applications include component or object interoperability such as via marshalling and de-marshalling routines that can benefit from dynamically generated pointers for inter/intra object communications. These techniques can also be applied to object serialization and de-serialization schemes, object persistence as well as in accordance with object applications such as object space classes that treat data as an object independent of an underlying data store employed by an application, for example.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to systems and methods that facilitate dynamic programming language execution in a managed code environment. A runtime code generator is provided within the framework of a managed object environment. The code generator includes a class allocator that reserves one or more method slots for a dynamic method call. A dynamic method builder then employs the method slots to generate an intermediate language stream that forms a method description. The method description is then fed to a Just-In-Time (JIT) compiler that returns at least one dynamically generated pointer to facilitate execution of the dynamic method call at runtime. A set of application programming interfaces (APIs) are provided to give users a managed "hook" or entry point into the compiler and associated managed execution environment, wherein various other applications for dynamically generated pointers are also supported. By using runtime-code generation, dynamic calls can be compiled at runtime, and if so desired in combination with memorization, the cost of dynamic code can be brought down close to that of ordinary method calls.

As used in this application, the terms "component," "class," "allocator," "system," "builder," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
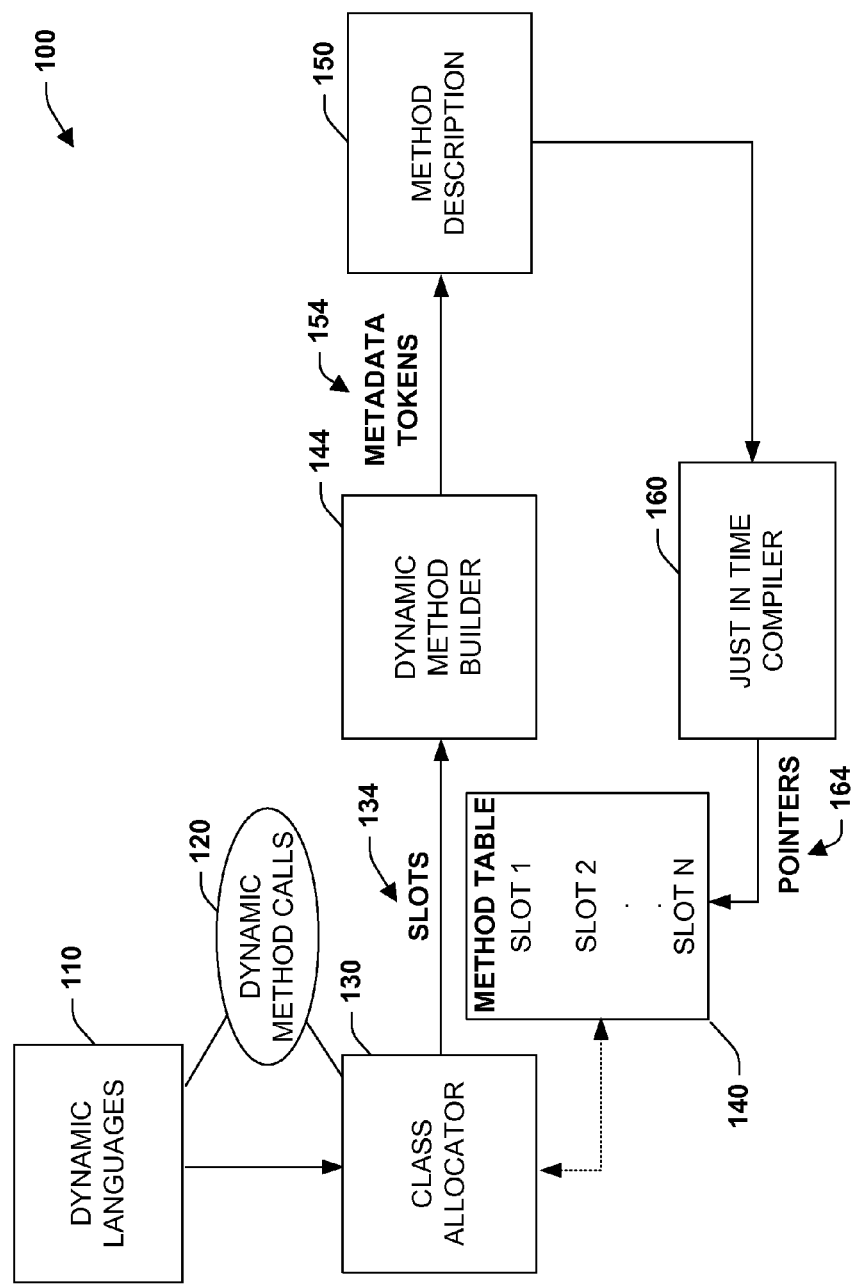
FIG. 1 is a schematic block diagram illustrating a dynamic method processing system in accordance with an aspect of the present invention.

Referring initially to FIG. 1, a system 100 illustrates dynamic method processing in accordance with an aspect of the present invention. One or more dynamic languages 110 generate dynamic method calls 120 that are received by a class allocator 130. The class allocator 130 reserves one or more slots 134 in a method table 140, as memory locations for function pointers that are associated with the dynamic method calls 120. In order to determine actual pointer values for the function pointers, a dynamic method builder 144 creates a method description 150 from an intermediate language stream of metadata tokens 154, whereby the method description is then submitted to a Just-In-Time compiler 160 that resolves values for one or more resolved pointers 164. The resolved pointers 164 are then dynamically mapped into the method table 140, wherein the dynamic language 110 invoking the dynamic method call 120 utilizes the resolved pointers 164 to call a respective function at runtime of the dynamic language.

In accordance with one aspect of the present invention, a user model is exposed as a set of APIs (described below with respect to FIG. 2) that extend current Reflection.Emit libraries such as creating a dynamic method builder class in addition to existing method builder classes. It is to be appreciated however, that the present invention can be applied to substantially any code structure employing dynamic method calls 120. In one example, an underlying implementation of CreateFunctionPointer is similar to that of arrays and partially transparent proxy. The present invention allocates a "class" (e.g., methodtable+eeclass) in the proper calling module and leaves a predefined number of slots 134 "open" in the method table 140. As requested, the slots 134 are made "concrete" by creating the method description 150 from a (dynamically) created IL stream 154. The compiler 160 is then run on these methods right away and returns the function pointer 164 associated with the dynamic method call 120.

A DynamicMethodBuilder class (described below) extends the regular MethodBuilder class to create an IL stream that contains dynamically generated metadata "tokens" 154. The present invention intercepts the resolution of these tokens 154 in an execution engine by returning the appropriate runtime handles directly in the method table 140.

It is noted that dynamically generated code can be automatically managed and reclaimed by a managed code garbage collector (not shown). Also, there may be one or more operating rules or security protocols placed on modules that employ or interact with dynamically generated code. For example, depending on the usage scenario (e.g., skip visibility checks, location of caller relative to location of new code), different permissions can be demanded such as:

Instantiating a DynamicMethod can result in a demand for ReflectionPermission(ReflectionPermissionFlag.ReflectionEmit);

Instantiating a DynamicMethod where the user desires to bypass the JIT visibility checks (by specifying skipVisibility==true) can result in a demand for ReflectionPermission(ReflectionPermissionFlag.MemberAccess); and Instantiating a DynamicMethod where the caller lives in a different assembly than the assembly the new method will be emitted to, can result in a demand for SecurityPermission (SecurityPermissionFlag.ControlEvidence).

The rationale for this is that by injecting code into another assembly one is effectively controlling the assembly-level evidence associated with the generated code sequence. This semantic and resulting permission request holds for assembly-level and type-level dynamic methods.

Note: the implication of this is that callers can emit a new instance method onto a type in the same assembly as the caller without demanding either ReflectionPermission(ReflectionPermissionFlag.MemberAccess) or SecurityPermission(SecurityPermissionFlag.ControlEvidence) (generally, there would still be a demand for ReflectionPermission (ReflectionPermissionFlag.ReflectionEmit)). Although this is a typically weaker semantic than current Reflection.Emit models (being able to emit instance methods on types in the callers assembly gives access to privates without requiring ReflectionPermission(ReflectionPermissionFlag.MemberAccess)), it thus improves the usefulness of this feature in a partially trusted scenario for dynamic languages.

The dynamic languages 10 include substantially any type of computer language such as C#, X#, Visual Basic, ECMAScript, PHP, Perl, Scheme, Ruby, Python, and Smalltalk for example, that are compiled by the compiler 160 and executed by a virtual machine described below. Such machines can include a Virtual Execution System (VES), Common Language Runtime (CLR), or Java Virtual Machine, for example. When executing intermediate language code, the virtual machine operates one or more computer applications on single or multiple computer systems (can be local and/or remote networked systems).

In general, the system 100 conforms with the ECMA Standard and Common Language Infrastructure (CLI) in which applications written in multiple high level languages may be executed in different system environments without the need to rewrite the application to take into consideration the unique characteristics of those environments. It is to be appreciated that other standards dealing with dynamic languages and/or virtual execution environments can be adapted in accordance with the present invention as well. The ECMA Standard consists of several sections which are readily available over the Internet in order to facilitate understanding various components by describing those components in their separate sections. These sections are:

Partition I: Architecture
Partition II: Metadata Definition and Semantics
Partition III: CIL Instruction Set
Partition IV: Profiles and Libraries
Partition V: Annexes The Common Language Infrastructure (CLI) provides a specification for executable code and the execution environment (the Virtual Execution System, or VES) in which it runs. Executable code is presented to the VES as modules. A module is typically a single file containing executable content in the format specified in. Generally, at the center of the Common Language Infrastructure (CLI) is a single type system, the Common Type System (CTS) that is shared by compilers, tools, and the CLI itself. It is the model that defines the rules the CLI follows when declaring, using, and managing types. The CTS establishes a framework that enables cross-language integration, type safety, and high performance code execution. The CLI includes the following basic components:

Common Type System. The Common Type System (CTS) provides a rich type system that supports the types and operations found in many programming languages. The Common Type System is intended to support the complete implementation of a wide range of programming languages.

Metadata. The CLI uses metadata to describe and reference the types defined by the Common Type System. Metadata is stored ("persisted") in a way that is independent of any particular programming language. Thus, metadata provides a common interchange mechanism for use between tools that manipulate programs (compilers, debuggers, etc.) as well as between these tools and the Virtual Execution System.

Common Language Specification. The Common Language Specification is an agreement between language designers and framework (class library) designers. It specifies a subset of the CTS Type System and a set of usage conventions. Languages provide their users the greatest ability to access frameworks by implementing at least those parts of the CTS that are part of the CLS. Similarly, frameworks will be most widely used if their publicly exposed aspects (classes, interfaces, methods, fields, etc.) use types that are part of the CLS and adhere to the CLS conventions.

Virtual Execution System. The Virtual Execution System implements and enforces the CTS model. The VES is responsible for loading and running programs written for the CLI. It provides the services needed to execute managed code and data, using the metadata to connect separately generated modules together at runtime (late binding).

Together, these aspects of the CLI form a unifying framework for designing, developing, deploying, and executing distributed components and applications. The appropriate subset of the Common Type System is available from each programming language that targets the CLI. Language-based tools communicate with each other and with the Virtual Execution System using metadata to define and reference the types used to construct the application. The Virtual Execution System uses the metadata to create instances of the types as needed and to provide data type information to other parts of the infrastructure (such as remoting services, assembly downloading, security, etc.).

Figure 2:
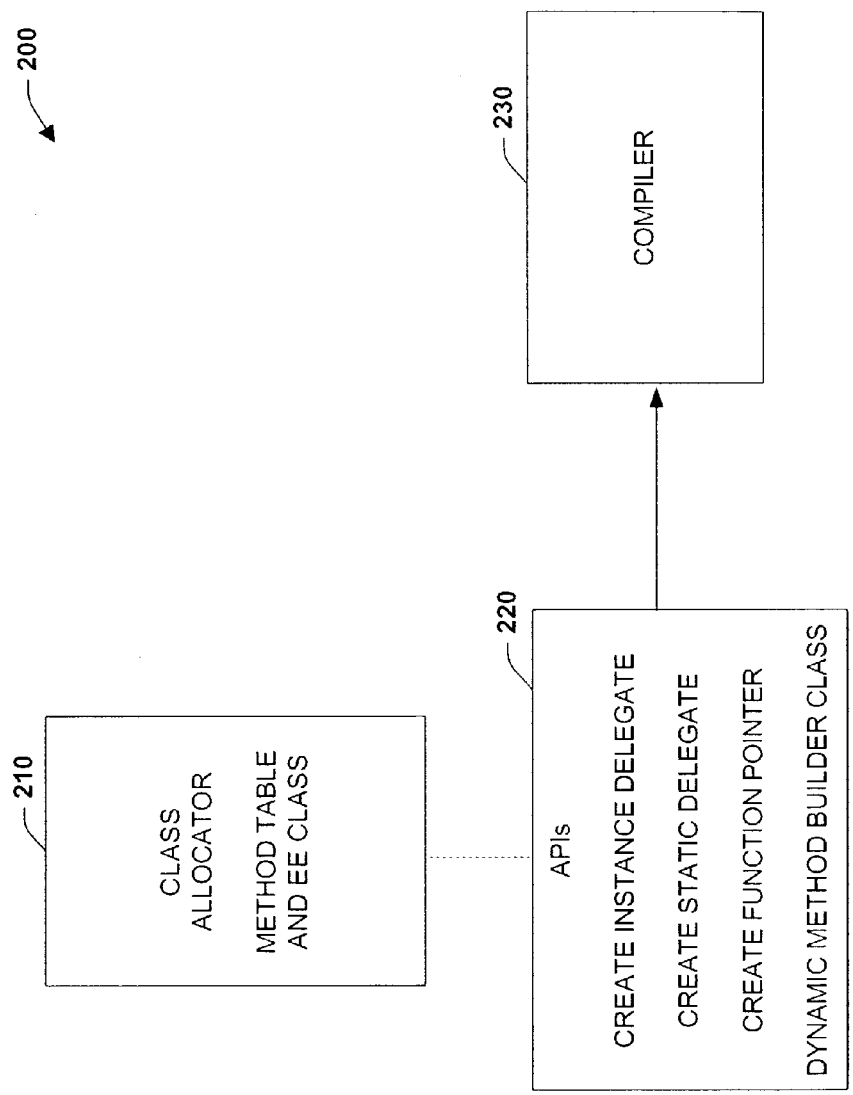
FIG. 2 is a block diagram illustrating a class allocator and API set in accordance with an aspect of the present invention.

Referring now to FIG. 2, a system 200 illustrates a class allocator 210 and API set 220 in accordance with an aspect of the present invention. The API set 220 provides hooks or interface options for interacting with a compiler 230 such as described above, and enables users or systems to retrieve dynamically generated pointers. This set includes standard type declaration APIs such as a create delegate API, create static delegate API, and a create function pointer API. In addition, a dynamic method builder class is provided to enable users to retrieve function pointer values for dynamic method calls. As illustrated, the class allocator 210 includes a method table and execution engine class designator. The respective APIs 220 are detailed as follows:

```
// create instance delegate
Delegate CreateDelegate (Type d, Object t, DynamicMethodBuilder m)
// create static delegate
Delegate CreateDelegate (Type d, Type t, DynamicMethodBuilder m)
// create raw function pointer
void* CreateFunctionPointer(DynamicMethodBuilder m)
```
The DynamicMethod class appears as follows:
```
    namespace System.Reflection.Emit {
  public sealed class DynamicMethod : MethodInfo {
    // This triplet of ctors is for adding static methods to modules. If not
    // specified, attributes=MethodAttributes.Public|MethodAttributes.Static,
    // skipVisiblity=false & callingConvention=CallingConvention.Standard. Demands
    // ReflectionPermission(ReflectionPermissionFlag.ReflectionEmit) on creation.
    // May also demand other permissions based on caller assembly & skipVisibility
    public DynamicMethod(string name, Type returnType, Type[] parameterTypes,
Module module);
    public DynamicMethod(string name, Type returnType, Type[] parameterTypes,
Module module, bool skipVisiblity);
    public DynamicMethod(string name, MethodAttributes attributes, CallingConventions
callingConvention, Type returnType, Type[] parameterTypes, Module module, bool
skipVisiblity);
    // This triplet of ctors is for adding static or instance methods to types. If
    // not specified, attributes=MethodAttributes.Public|MethodAttributes.Instance,
    // skipVisiblity=false & callingConvention=CallingConvention.Standard. Demands
    // ReflectionPermission(ReflectionPermissionFlag.ReflectionEmit) on creation.
    // May also demand other permissions based on caller assembly & skipVisibility
    public DynamicMethod(string name, Type returnType, Type[] parameterTypes, Type
type);
    public DynamicMethod(string name, Type returnType, Type[] parameterTypes, Type
type, bool skipVisiblity);
    public DynamicMethod(string name, MethodAttributes attributes, CallingConventions
callingConvention, Type returnType, Type[] parameterTypes, Type type, bool
skipVisiblity);
    // Creates a delegate used for invocation of an module-level dynamic method
    // Calling CreateDelegate(Type) for a type-level method throws.
    // After calling CreateDelegate the DynamicMethod, the associated ILGenerator,
    // and any ParameterBuilder instances throws InvalidOperationException for
    // on operations that would modify the dynamic method
    public Delegate CreateDelegate(Type type);
    // Creates a delegate used for invocation of an type-level dynamic method.
    // Calling this overload of CreateDelegate for an module-level method throws.
    // Pass an instance of the owning type as the target for an instance method.
    // Pass null as the target for a static method, throws if non-null.
    // After calling CreateDelegate the DynamicMethod the associated ILGenerator,
    // and any ParameterBuilder instances throws InvalidOperationException for
    // on operations that would modify the dynamic method in any way
    public Delegate CreateDelegate(Type type, object target);
    // Members inherited/overridden from MemberInfo
    // Returns null for module-level dynamic methods
    // Returns the containing type for type-level dynamic methods
    public override Type DeclaringType { get; }
    // Returns null for module-level dynamic methods
    // Returns the containing type for type-level dynamic methods
    public override Type ReflectedType { get; }
    // Returns the name passed in when the dynamic method was created
    public string Name { get; }
    // Retrieve the CAs defined on this dynamic method. Inherit=true
    // has no meaning for module-level dynamic methods.
    public override object[] GetCustomAttributes(bool inherit);
    public override object[] GetCustomAttributes(Type attributeType, bool inherit);
    public override bool IsDefined(Type attributeType, bool inherit);
    // Returns 0 to guarantee the token cannot be embedded directly in any IL streams
    public override int MetaDataToken { get; }
    // Return the module that the method is part of
    public override Module Module { get; }
```

-continued

```
// Members inherited/overridden from MethodBase
    // Return the MethodAttributes as specified at creation time
    public override MethodAttributes Attributes { get; }
// Return the CallingConvention as specified at creation time
    public override CallingConventions CallingConvention { get; }
    // Throws exception to prevent use of RuntimeMethodHandle.GetFunctionPointer( )
    public override RuntimeMethodHandle MethodHandle { get; }
    // Returns MethodImplAttributes.IL|MethodImplAttributes.NoInlining
    public override MethodImplAttributes GetMethodImplementationFlags( );
    // Return an array of ParameterInfos describing the arguments
    public override ParameterInfo[] GetParameters( );
    // Invokes the dynamic method, after calling the DynamicMethod cannot be modified
    public override object Invoke(object obj, BindingFlags invokeAttr, Binder binder,
object[] parameters, CultureInfo culture);
    public object Invoke(object obj, object[] parameters);
    // These are static or non-virtual
    public bool IsAbstract { get; }
    public bool IsAssembly { get; }
    public bool IsConstructor { get; }
    public bool IsFamily { get; }
    public bool IsFamilyAndAssembly { get; }
    public bool IsFamilyOrAssembly { get; }
    public bool IsFinal { get; }
    public bool IsHideBySig { get; }
    public bool IsPrivate { get; }
    public bool IsPublic { get; }
    public bool IsSpecialName { get; }
    public bool IsStatic { get; }
    public bool IsVirtual { get; }
    // Return a DynamicMethod which cannot be modified
    public static MethodBase GetCurrentMethod( );
    // Return a DynamicMethod which cannot be modified
    // Can only occur with a synthesized RuntimeMethodHandle
    public static MethodBase GetMethodFromHandle(RuntimeMethodHandle handle);
// Members inherited/overridden from MethodInfo
    // Returns MemberTypes.Method
    public override MemberTypes MemberType { get; }
    // Return the return type, CAs on the return type, and the return Parameter
    public override Type ReturnType { get; }
    public override ICustomAttributeProvider ReturnTypeCustomAttributes { get; }
    public override ParameterInfo ReturnParameter { get; }
// Members 'borrowed' from MethodBuilder
    // Tell the JIT whether locals should automatically be initialized
    public bool InitLocals { get; set; }
    public override string ToString( );
    // Set declarative security demands on the dynamic method
    public void AddDeclarativeSecurity(SecurityAction action, PermissionSet pset);
    // Returns this
    public override MethodInfo GetBaseDefinition( );
        // Returns an object with runtime type DynamicILGenerator
        public ILGenerator GetILGenerator( );
        public ILGenerator GetILGenerator(int size);
        // Lets the user specify custom attributes on the dynamic method
        public void SetCustomAttribute(ConstructorInfo con, byte[] binaryAttribute);
        public void SetCustomAttribute(CustomAttributeBuilder customBuilder);
        // ParameterInfo - returns null in M2
        public ParameterBuilder DefineParameter(int position, ParameterAttributes attributes,
        string strParamName);
    }
}
```

Figure 3:
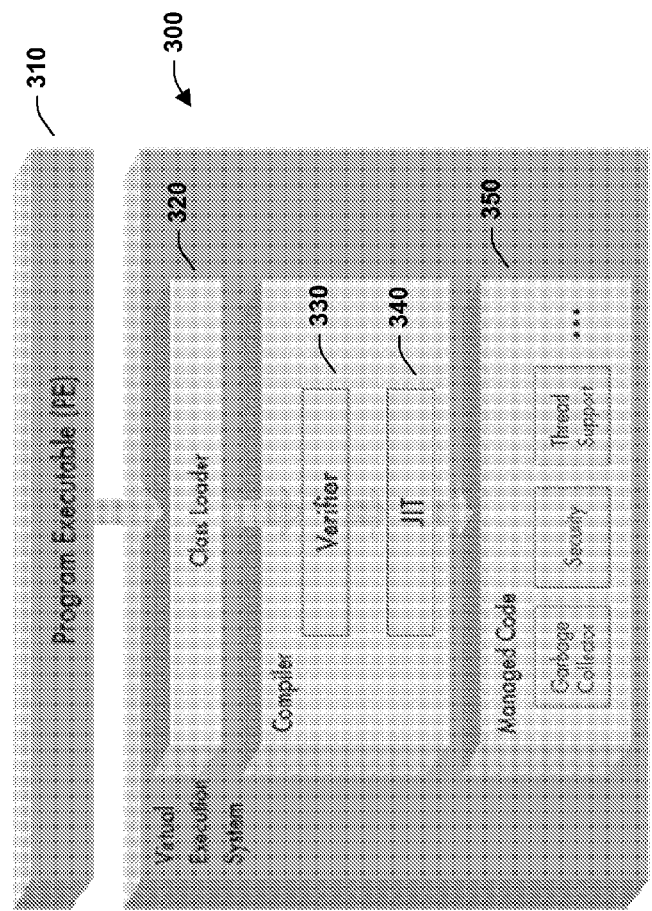
FIG. 3 is a block diagram illustrating a virtual execution system in accordance with an aspect of the present invention.

Turning to FIG. 3, a system 300 illustrates a virtual execution system 300 in accordance with an aspect of the present invention. An executable program 310 (e.g., derived from dynamic language source code) is fed to a class loader 320 which forms part of the virtual execution system 300. Output from the class loader 320 is then processed by a code verifier 330 and a Just-In-Time compiler 340 which outputs managed code 350 to be executed on a target machine. These components are described in more detail below with respect to FIG. 5. As illustrated, the managed code 350 includes such aspects as a garbage collector, security components, and thread support among other aspects.

A managed execution process typically includes the following processes when executing dynamic code:

1. Choosing a compiler.
    To obtain the benefits provided by the system 300, one or more language compilers are employed at the target system as described below with respect to FIG. 4.
2. The code then compiled is to an intermediate language (e.g., MSIL).
    Compiling translates source code into IL and generates the required metadata.
3. Compiling IL to native code.
    At execution time, the just-in-time (JIT) compiler 340 translates the IL into native code. During this compilation, code passes a verification process that examines the IL and metadata to find out whether the code can be determined to be type safe.

4. Executing code.

The virtual execution system 300 provides the infrastructure that enables execution to take place as well as a variety of services that can be used during execution.

In one aspect relating to code execution and formats, assemblies are the building blocks of managed applications; they form the fundamental unit of deployment, version control, reuse, activation scoping, and security permissions. An assembly is a collection of types and resources that are built to work together and form a logical unit of functionality. An assembly provides the managed system with the information it needs to be aware of type implementations, wherein a type generally does not exist outside the context of an assembly.

An assembly generally performs the following functions:

It contains code that the managed system executes. Intermediate language (code in a portable executable (PE) file will not be executed if it does not have an associated assembly manifest. Note that each assembly can typically have only one entry point (e.g., DllMain, WinMain, or Main).

It forms a security boundary. An assembly is the unit at which permissions are requested and granted.

It forms a type boundary. Every type's identity includes the name of the assembly in which it resides. A type called MyType loaded in the scope of one assembly is not the same as a type called MyType loaded in the scope of another assembly.

It forms a reference scope boundary. The assembly's manifest contains assembly metadata that is used for resolving types and satisfying resource requests. It specifies the types and resources that are exposed outside the assembly. The manifest also enumerates other assemblies on which it depends.

It forms a version boundary. The assembly is the smallest versionable unit in the managed system; generally, all types and resources in the same assembly are versioned as a unit. The assembly's manifest describes the version dependencies specified for any dependent assemblies.

It forms a deployment unit. When an application starts, typically, only the assemblies that the application initially calls are present. Other assemblies, such as localization resources or assemblies containing utility classes, can be retrieved on demand. This allows applications to be kept simple and thin when first downloaded.

It is the unit at which side-by-side execution is supported.

Assemblies can be static or dynamic. Static assemblies can include managed system types (interfaces and classes), as well as resources for the assembly (bitmaps, JPEG files, resource files, and so forth). Static assemblies are stored on disk in portable executable (PE) files. Users can also employ the managed framework to create dynamic assemblies, which are run directly from memory and are not saved to disk before execution.

As noted above, various libraries can be extended to support dynamic method processing in accordance with the present invention. In one aspect, a System.Reflection.Emit namespace contains classes that allow a compiler or tool to emit metadata and intermediate language and optionally generate a PE file on disk. The primary clients of these classes are script engines and compilers. The following tables include a description of a sample namespace hierarchy:

Namespace hierarchy

| Classes | |
|---|---|
| Class | Description |
| AssemblyBuilder | Defines and represents a dynamic assembly. |
| ConstructorBuilder | Defines and represents a constructor of a dynamic class. |
| CustomAttributeBuilder | Helps build custom attributes. |
| EnumBuilder | Describes and represents an enumeration type. |
| EventBuilder | Defines events for a class. |
| FieldBuilder | Defines and represents a field. This class cannot be inherited. |
| ILGenerator | Generates intermediate language (IL) instructions. |
| LocalBuilder | Represents a local variable within a method or constructor. |
| MethodBuilder | Defines and represents a method (or constructor) on a dynamic class. Also can be extended to include Dynamic Method Builder class as described above. |
| MethodRental | Provides a fast way to swap method body implementation given a method of a class. |
| ModuleBuilder | Defines and represents a module. Get an instance of ModuleBuilder by calling DefineDynamicModule. |
| OpCodes | Provides field representations of the Intermediate Language (IL) instructions for emission by the ILGenerator class members (such as Emit). |
| ParameterBuilder | Creates or associates parameter information. |
| PropertyBuilder | Defines the properties for a type. |
| SignatureHelper | Provides methods for building signatures. |
| TypeBuilder | Defines and creates new instances of classes during runtime. |
| UnmanagedMarshal | Represents the class that describes how to marshal a field from managed to unmanaged code. This class cannot be inherited. |

| Structures | |
|---|---|
| Structure | Description |
| EventToken | Represents the Token returned by the metadata to represent an event. |
| FieldToken | The FieldToken struct is an object representation of a token that represents a field. |
| Label | Represents a label in the instruction stream. Label is used in conjuction with the ILGenerator class. |
| MethodToken | The MethodToken struct is an object representation of a token that represents a method. |
| OpCode | Describes an intermediate language (IL) instruction. |
| ParameterToken | The ParameterToken struct is an opaque, representation of the token returned by the metadata to represent a parameter. |
| PropertyToken | The PropertyToken struct is an opaque representation of the Token returned by the metadata to represent a property. |
| SignatureToken | Represents the Token returned by the metadata to represent a signature. |
| StringToken | Represents a token that represents a string. |
| TypeToken | Represents the Token returned by the metadata to represent a type. |

| Enumerations | |
|---|---|
| Enumeration | Description |
| AssemblyBuilderAccess | Defines the access modes for a dynamic assembly. |
| FlowControl | Describes how an instruction alters the flow of control. |

-continued

| | |
|---|---|
| OpCodeType | Describes the types of the intermediate language (MSIL) instructions. |
| OperandType | Describes the operand type of intermediate language (IL) instruction. |
| PackingSize | Specifies one of two factors that determine the memory alignment of fields when a type is marshaled. |
| PEFileKinds | Specifies the type of the portable executable (PE) file. |
| StackBehaviour | Describes how values are pushed onto a stack or popped off a stack. |

Figure 4:
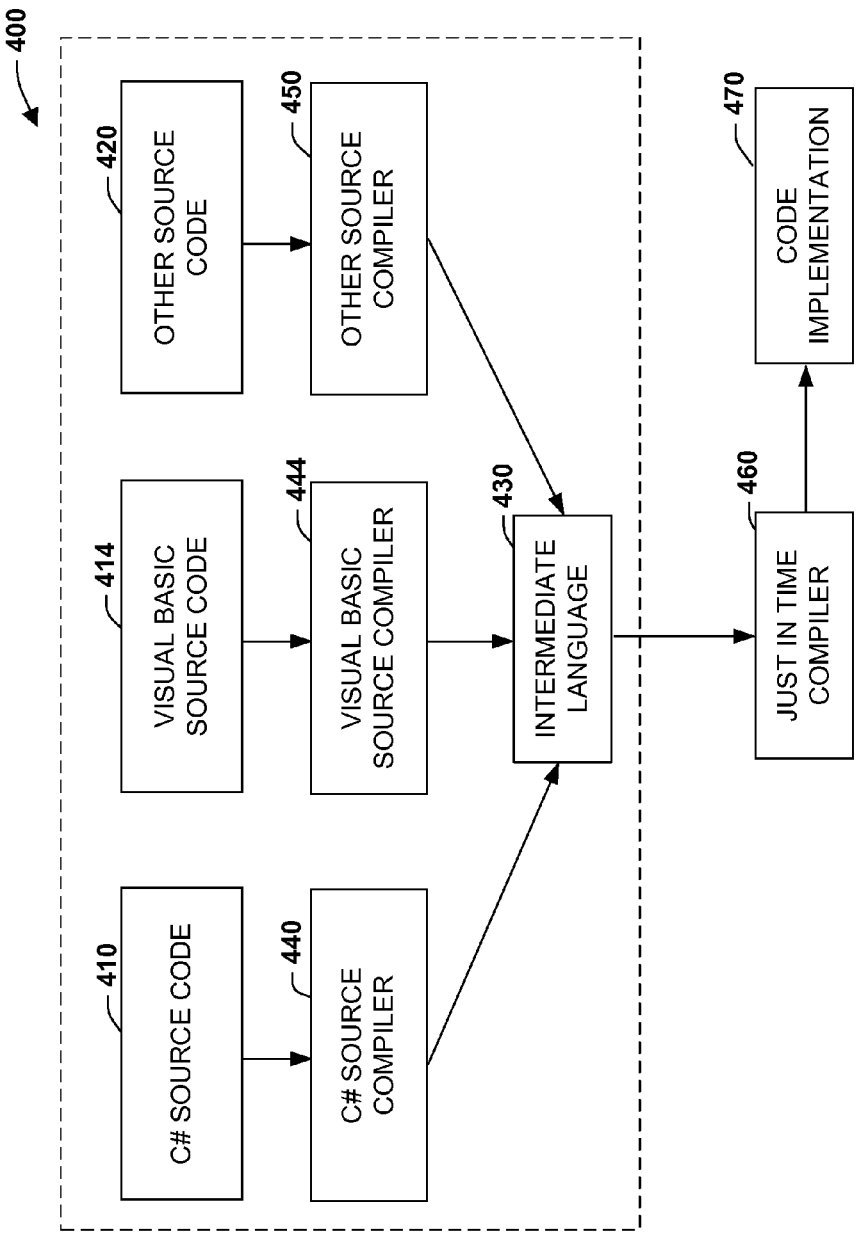
FIG. 4 is a block diagram illustrating dynamic language execution in accordance with an aspect of the present invention.

FIG. 4 is a diagram 400 illustrating dynamic language execution in accordance with an aspect of the present invention. In this aspect, one or more different forms of source code 410–420 are compiled to an intermediate language 430 via respective source coplers 440–450. For example, a C# source code module 410 is compiled via a C# source code compiler that compiles the C# source code into the intermediate language 430 which is then re-compiled via a JIT compiler 460 and executed as a code implementation on a target machine at 470. It is to be appreciated that the code languages illustrated in FIG. 4 are exemplary in nature and that various languages can be employed with the present invention as noted above.

Figure 5:
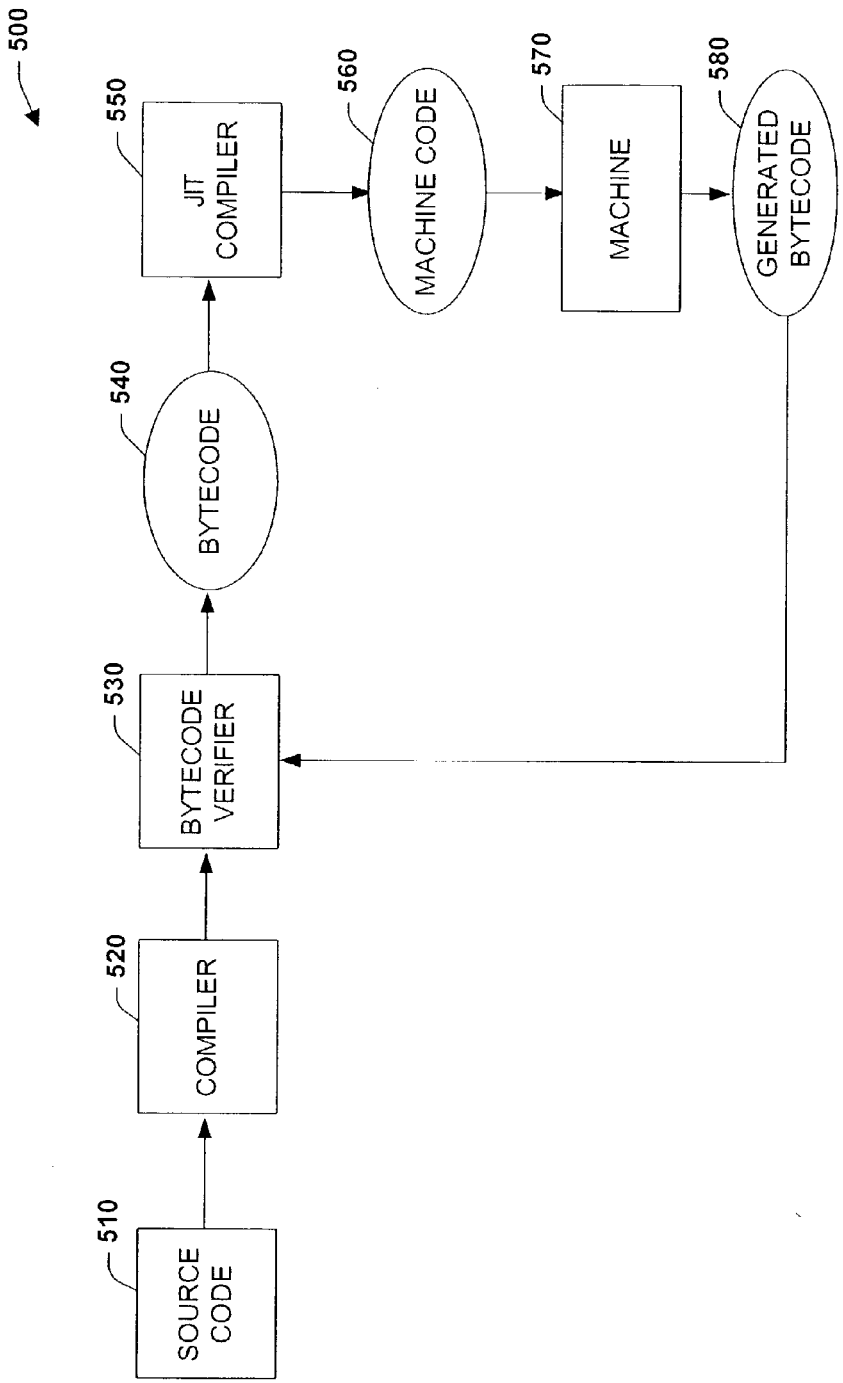
FIG. 5 illustrates source code to machine code execution in accordance with an aspect of the present invention.

FIG. 5 depicts a system 500 that illustrates source code to machine code execution in accordance with an aspect of the present invention. The system 500 depicts a more detailed illustration of a system for processing dynamic method calls in accordance with the present invention. Source code 510 is compiled via a source code compiler 520 and fed to a bytecode verifier 530. The bytecode verifier 530 outputs bytecode 540 to a JIT compiler 550 that generates machine code 560 to be executed on a target machine 570. As illustrated, if other bytecode is generated during target machine execution at 580, this code can also be verified at 530 and subsequently compiled.

Figure 6:
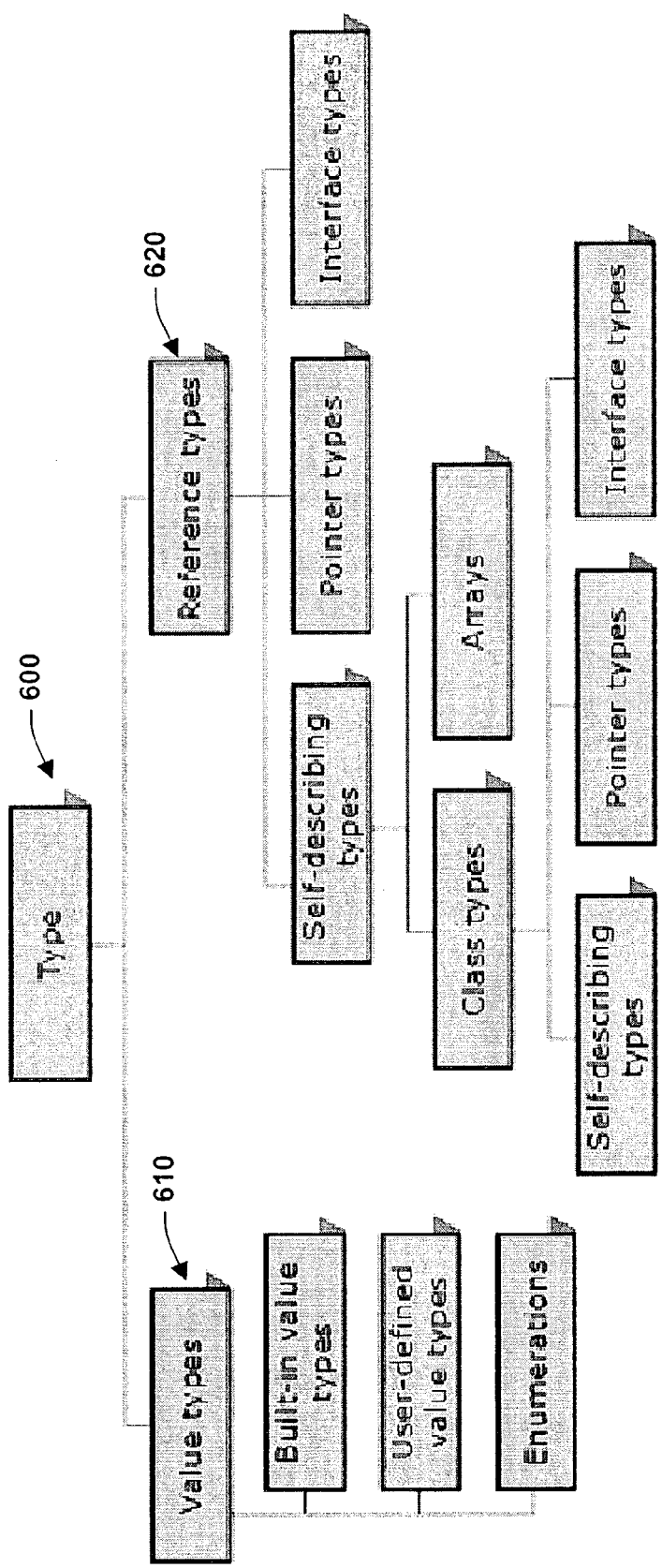
FIG. 6 illustrates system types in accordance with an aspect of the present invention.

FIG. 6 illustrates various system types 600 in accordance with an aspect of the present invention. The common type system supports two general categories of types, wherein respective types are further divided into subcategories:

Value types 610

Value types directly contain their data, and instances of value types are allocated on the stack or allocated inline in a structure. Value types can be built-in (implemented by the managed system), user-defined, or enumerations.

Reference types 620

Reference types store a reference to the value's memory address, and are allocated on the heap. Reference types can be self-describing types, pointer types, or interface types. The type of a reference type can be determined from values of self-describing types. Self-describing types are further split into arrays and class types. The class types are user-defined classes, boxed value types, and delegates. Managed systems support reference types called delegates that serve a purpose similar to that of function pointers in C++. Unlike function pointers, a delegate instance is independent of the classes of the methods it encapsulates; all that generally matters is that those methods be compatible with the delegate's type. Also, while function pointers can reference static functions, a delegate can reference both static and instance methods. Delegates are mainly used for event handlers and callback functions in a managed framework. It is also noted that variables that are value types have their own copy of data, and therefore operations on one variable generally do not affect other variables. Variables that are reference types can refer to the same object; therefore, operations on one variable can affect the same object referred to by another variable.

Figure 7:
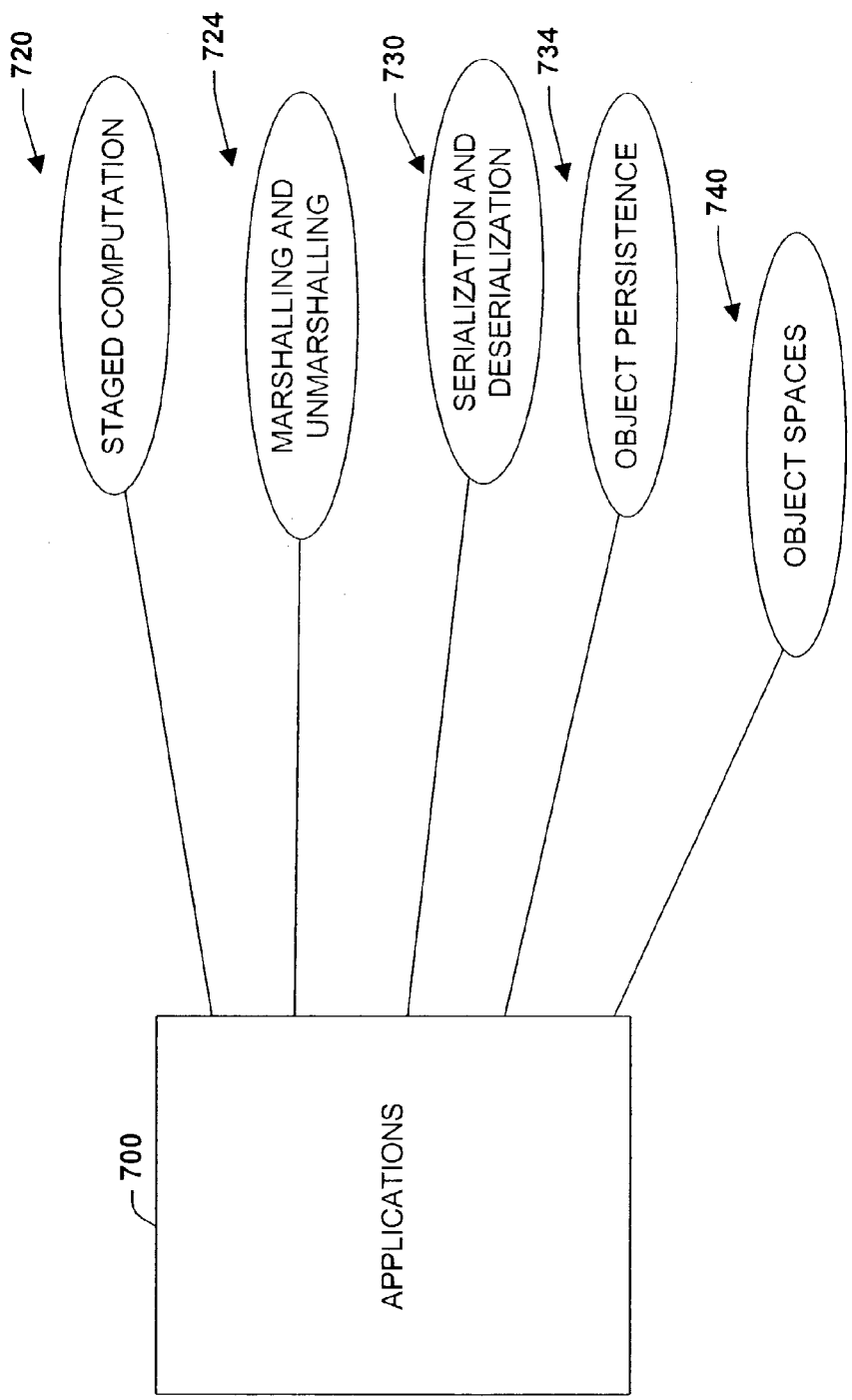
FIG. 7 is a diagram illustrating dynamic method applications in accordance with an aspect of the present invention.

FIG. 7 illustrates dynamic method applications 700 in accordance with an aspect of the present invention. In one application, dynamic method and pointer generation may be applied to staged computations at 720 such as in generating a state machine from a regular expression at runtime (e.g., generate state machine from a logic expression describing a state machine). Thus, initial logic may be compiled, wherein portions of the logic dynamically resolved as described above before other logic stages are further computed or designed. Other applications include component or object interoperability such as via marshalling and de-marshalling routines at 724 that can generate and deploy dynamically generated pointers for inter/intra object communications.

Dynamic techniques employing pointers can also be applied to object serialization and de-serialization schemes at 730. Object serialization extends the core of managed Input/Output classes with support for objects. Object Serialization supports the encoding of objects, and the objects reachable from them, into a stream of bytes (or bytes to stream); and it supports the complementary reconstruction of the object graph from the stream. Serialization is used for lightweight persistence and for communication via sockets or Remote Method Invocation (RMI), for example. The default encoding of objects protects private and transient data, and supports the evolution of the classes. A class may implement its own external encoding and is then responsible for the external format. Also, dynamic pointer generation may be applied to object persistence or other object management functions at 734, Other applications 700 include such network applications as Object Spaces at 740. Object Spaces (e.g., provided in .Net) are a set of classes and interfaces that enable users to treat data as an object (or objects), independent of the underlying data store used by an application. Object Spaces builds on and contains a set of new data access APIs within a .NET Framework, for example, to provide access to relational data sources such as an SQL Server, OLE DB data sources, and so forth.

With Object Space, users can perform the following data related tasks/steps:

Get data, as objects, from a data source using a particular query criteria

Navigate one-to-many or one-to-one relationships using the objects returned

Modify the values/properties of the objects

Resolve changes back to the data source

To keep application code independent of the data source, an XML based mapping file specifies relationships between relational data and business objects as illustrated in the following sample:

```
---- Sample Code ----
using System;
using System.Data.ObjectSpaces;
public class Customer
{
    private int_Id;
    public string CustName;
    public int Id
    { get
        {
```

```
                    -continued return_Id;
      }
      set
      {
      }
    }
  }
}
public class SimpleExample
{
  public static void Main( )
  {
    //Mapping and DataSources files
    string theMapping = "mapping.xml";
    string theDataSources = "connect.xml";
    //create a new objectspace
    ObjectSpace os = new ObjectSpace(theMapping, theDataSources,
    false);
    //Iterate through all customers whose name starts with an 'A'
    foreach (Customer c in os.GetObjectReader(new
    ObjectQuery(typeof(Customer),"
CustName == 'Joseph' ")))
      Console.WriteLine(c.Name);
  }
}
```

Figure 8:
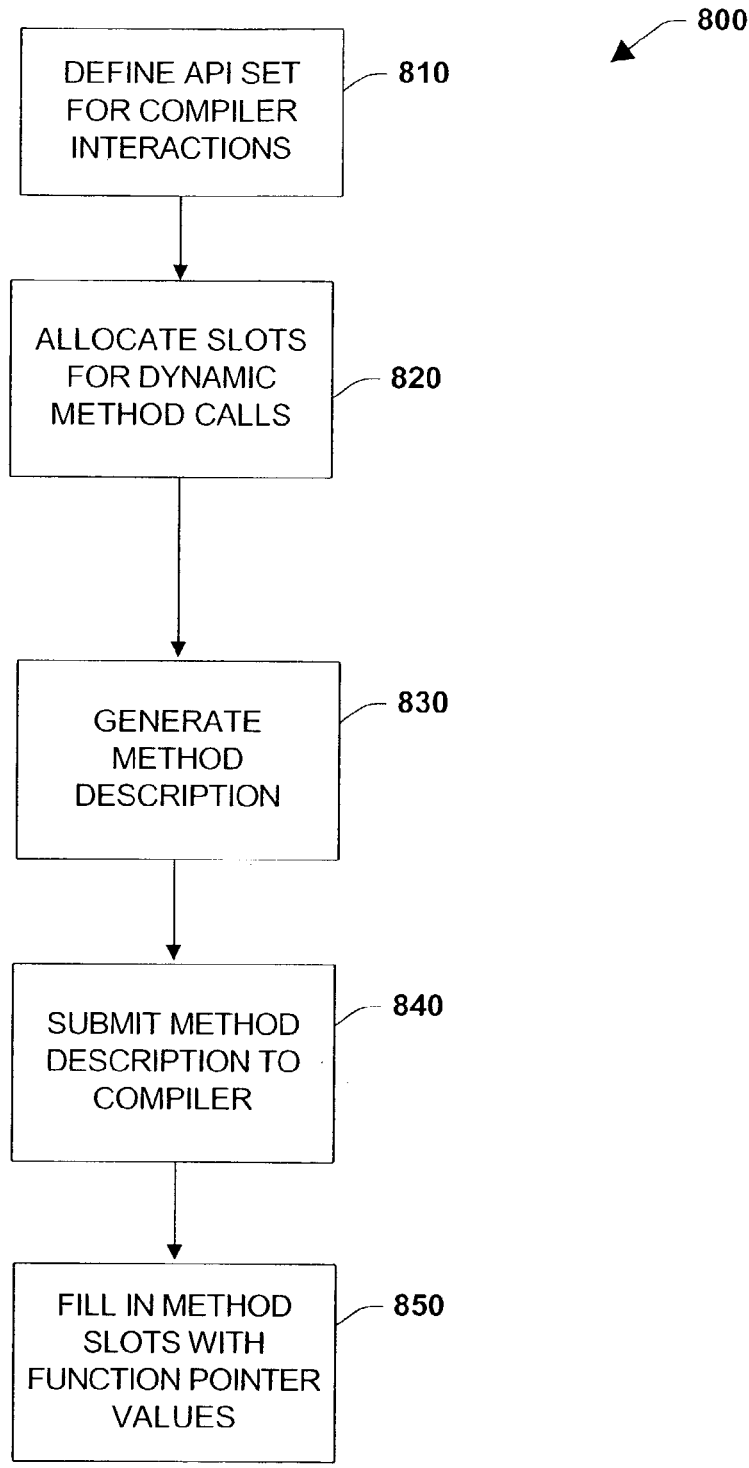
FIG. 8 is a flow diagram illustrating dynamic function pointer generation in accordance with an aspect of the present invention.

FIG. 8 is a methodology 800 illustrating dynamic function pointer generation in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 8, and proceeding to 810, an API set is defined for interacting with a compiler to support dynamic method calls in accordance with the present invention. As noted above, such APIs include create delegate calls, create static delegate calls, create function pointer calls, and dynamic method builder calls. At 820, one or more slots are allocated from receiving dynamically generated pointers. Such slots can include memory variables or array locations for storing respective pointers. At 830, a method description is generated in response to a dynamic method call, wherein the description is created from a dynamic intermediate language stream of data. At 840, the method description is submitted to a compiler for resolution of pointers relating to the dynamic method call. At 850, the compiler returns one or more dynamically generated pointers that have been resolved from the method description. The resolved pointers are then placed into the allocated slots described above, wherein the dynamic method call employs the pointers to execute a respective function or module.

Figure 9:
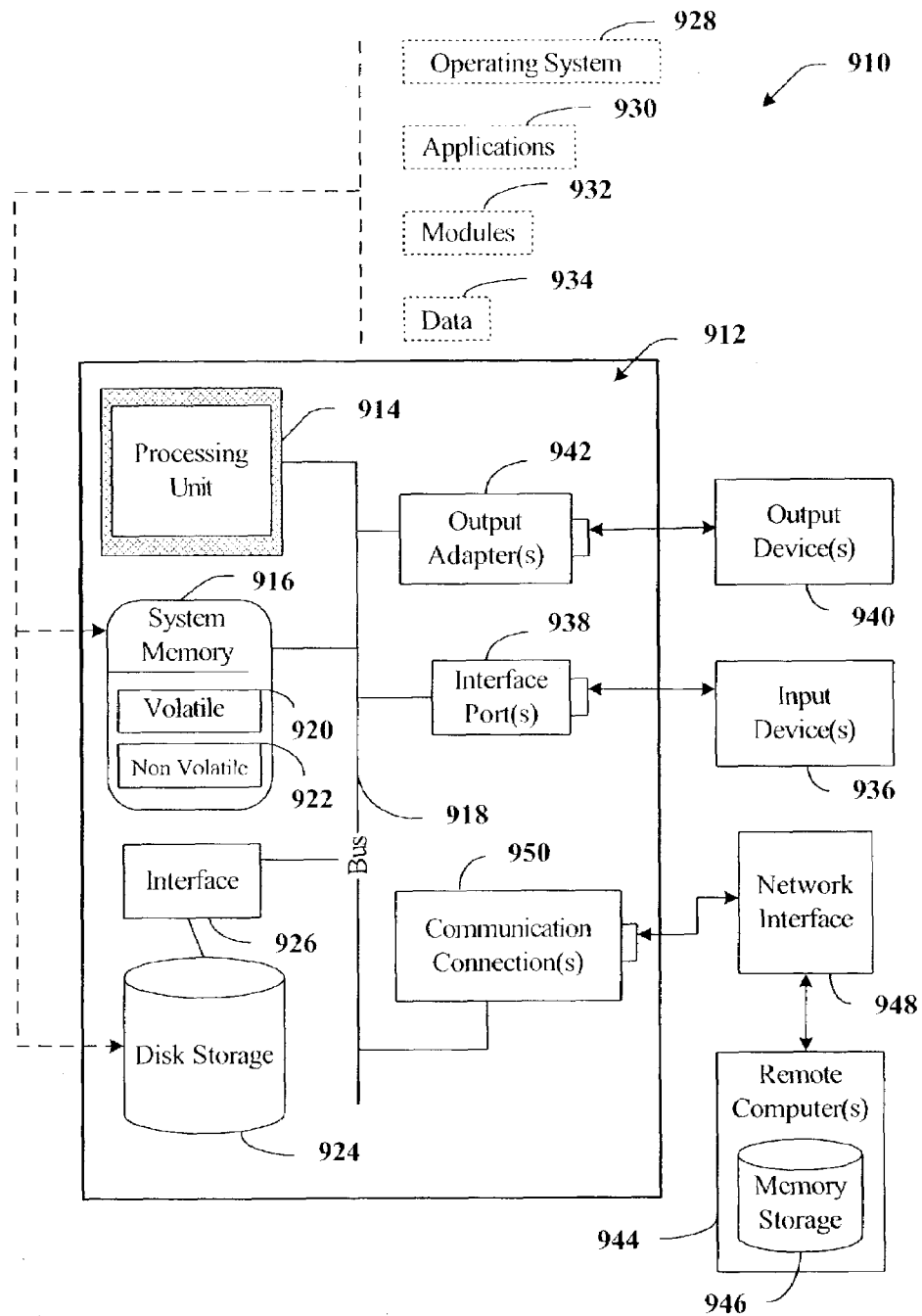
FIG. 9 is a schematic block diagram illustrating a suitable operating environment in accordance with an aspect of the present invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-90 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB).

Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
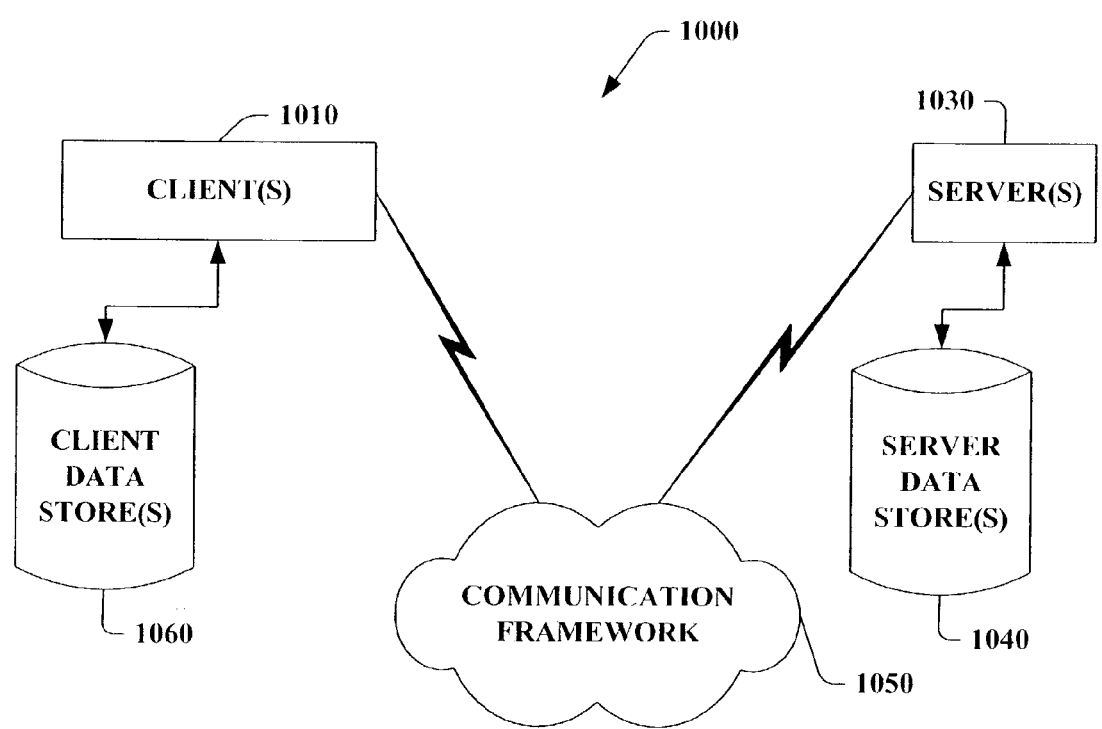
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable medium having computer readable instructions stored thereon for implementing a runtime code generator for a managed object environment, the runtime code generator comprising:
   a class allocator that, upon receiving a dynamic method call, reserves one or more method slots in a method table having memory locations for at least one function pointer associated with the dynamic method call; and
   a dynamic method builder that creates a method description from an intermediate language stream of metadata tokens and submits the method description to a Just-In-Time compiler that is configured to resolve a value for the at least one function pointer and return the value of the at least one function pointer that maps to the one or more method slots to facilitate execution of the dynamic method call at runtime.

2. The computer readable medium of claim 1, further comprising a user model that is exposed as a set of APIs for interacting with the compiler.

3. The computer readable medium of claim 2, the APIs include at least one of a create instance delegate API, a create static delegate API, and a create function pointer API.

4. The computer readable medium of claim 2, the APIs include a dynamic method builder class that extends a method builder class to create an intermediate language stream that contains dynamically generated metadata tokens.

5. The computer readable medium of claim 1, the dynamic method call relates to a dynamic programming language selected from a group comprising: X#, ECMAScript, PHP, Perl, Scheme, Ruby, Python, and Smalltalk.

6. The computer readable medium of claim 1, the Just-In-Time compiler being a Virtual Execution System (VES), a Common Language Runtime (CLR), or a Java Virtual Machine.

7. The computer readable medium of claim 1, at least one of the class allocator and the dynamic method builder conform to an "ECMA Standard" that defines a Common Language Infrastructure (CLI).

8. The computer readable medium of claim 7, the ECMA standard includes at least five partitions, the partitions including a Partition I: Architecture, a Partition II: Metadata Definition and Semantics, a Partition III: CIL Instruction Set, a Partition IV: Profiles and Libraries and a Partition V: Annexes.

9. The computer readable medium of claim 7, the Common Language Infrastructure (CLI) includes at least one of a common type system, a metadata description, a common language specification, and a Virtual Execution System.

10. The computer readable medium of claim 1, further comprising at least one of a class loader, a verifier, and a garbage collector.

11. The computer readable medium of claim 10, further comprising at least one source code compiler that compiles source code into an intermediate language.

12. The computer readable medium of claim 11, further comprising a bytecode verifier that analyzles output from the source code compiler.

13. The computer readable medium of claim 1, the dynamic method builder being a part of at least one application, the at least one application being a staged computation, a marshalling application, a de-marshalling application, a serialization application, a de-serialization application, an object persistence application, and/or an object space application.

14. The computer readable medium of claim 1, further comprising a garbage collector that reclaims the memory allocated to execute the dynamic method call.

15. A system that facilitates dynamic code execution, the system stored on computer-readable media, the system comprising:
- means for receiving a dynamic method call and allocating at runtime one or more slots in a method table for storing one or more function pointers associated with execution of the dynamic method call;
- means for generating a method description from an intermediate language stream of metadata tokens;
- means for submitting the method description to a Just-In-Time compiler;
- means for generating at least one value for at least one of the one or more function pointers from the method description by a Just-In-Time compiler; and
- means for dynamically mapping the one or more slots in the method table with the at least one value of the one or more function pointers.

16. A method that facilitates dynamic data type processing, comprising:
- reserving one or more memory locations in a method table by a class allocator in accordance with a user model upon receiving the dynamic function call;
- creating a description for the called dynamic function from an intermediate language stream of metadata tokens;
- submitting the description to a Just-In-Time compiler;
- automatically generating a function pointer f6r the dynamic function by a Just-In-Time compiler, the function pointer relating to an address of the dynamic function description; and
- dynamically mapping the generated function pointer into the reserved memory locations in the method table.

17. The method of claim 16, the user model includes at least one of a create instance delegate, a create static delegate, and a create function pointer interface.

18. The method of claim 16, the user model includes a dynamic method builder class that creates the intermediate language stream that contains the metadata tokens.

19. The method of claim 18, the dynamic method builder class relating to at least one application including a staged computation application, a marshalling application, a de-marshalling application, a serialization application, a de-serialization application, an object persistence application, and/or an object space application.

20. The method of claim 16, further comprising automatically garbage collecting dynamically generated code.

21. The method of claim 16, further comprising providing one or more security procedures to facilitate operations of the dynamic function, the security procedures includes at least one of:
- Instantiating a DynamicMethod resulting in a demand for ReflectionPermission(ReflectionPermissionFlag.ReflectionEmit);
- Instantiating a DynamicMethod where a user desirea to bypass JIT visibility checks (by specifying skipVisibility=true) resulting in a demand for ReflectionPermission(ReflectionPermissionFlag.MemberAccess);
- Instantiating a DynamicMethod where a caller lives in a different assembly than another assembly a new method is emitted to, resulting in a demand for SecurityPermission(SecurityPermissionFlag.ControlEvidence).

* * * * *